(12) United States Patent
Pereira et al.

(10) Patent No.: US 9,843,884 B2
(45) Date of Patent: Dec. 12, 2017

(54) METHOD FOR DETECTING DYNAMICALLY THAT SECURE ELEMENTS ARE ELIGIBLE TO AN OTA CAMPAIGN AND CORRESPONDING OTA SERVER

(71) Applicant: GEMALTO SA, Meudon (FR)

(72) Inventors: Gabriel Pereira, Gemenos (FR); Tristan Boiteux, Gemenos (FR); Kim Depusse, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/512,876

(22) PCT Filed: Sep. 15, 2015

(86) PCT No.: PCT/EP2015/071005
§ 371 (c)(1),
(2) Date: Mar. 21, 2017

(87) PCT Pub. No.: WO2016/046015
PCT Pub. Date: Mar. 31, 2016

(65) Prior Publication Data
US 2017/0295449 A1 Oct. 12, 2017

(30) Foreign Application Priority Data
Sep. 22, 2014 (EP) .................................... 14306451

(51) Int. Cl.
*H04W 4/00* (2009.01)
*H04W 4/14* (2009.01)
(52) U.S. Cl.
CPC ............. *H04W 4/001* (2013.01); *H04W 4/14* (2013.01)

(58) Field of Classification Search
CPC ............................... H04W 4/001; H04W 4/14
See application file for complete search history.

(56) References Cited

U.S. PATENT DOCUMENTS

| | | | | |
|---|---|---|---|---|
| 7,623,852 | B2 * | 11/2009 | Gnuschke | H04M 3/42178 455/410 |
| 8,073,937 | B2 * | 12/2011 | Martinent | H04W 8/245 455/418 |

(Continued)

OTHER PUBLICATIONS

International Search Report (PCT/ISA/210) dated on Jan. 8, 2016, by the European Patent Office as the International Searching Authority for International Application No. PCT/EP2015/071005.

(Continued)

*Primary Examiner* — Nathan Mitchell
(74) *Attorney, Agent, or Firm* — Buchanan Ingersoll & Rooney PC

(57) ABSTRACT

The invention concerns notably a method for detecting dynamically that secure elements are eligible to at least one OTA campaign for updating these secure elements, each secure element cooperating with a telecommunication terminal in a telecommunication network, this updating being realized by an OTA server. According to the invention, the method consists in: Detecting which secure elements have not polled the OTA server for a given time frame; Checking eligibility for these secure elements; Updating the secure elements that did not poll the OTA server for this given time frame and that are eligible to the OTA campaign by pushing messages to these secure elements.

5 Claims, 1 Drawing Sheet

(56) References Cited

U.S. PATENT DOCUMENTS

| | | | | |
|---|---|---|---|---|
| 8,555,273 | B1* | 10/2013 | Chia | G06F 8/665 |
| | | | | 717/168 |
| 8,588,850 | B1* | 11/2013 | Venkataramu | H04L 63/0853 |
| | | | | 455/558 |
| 9,621,527 | B2* | 4/2017 | Amiel | H04L 63/08 |
| 2008/0004010 | A1* | 1/2008 | Boberg | H04M 3/42365 |
| | | | | 455/435.1 |
| 2008/0058015 | A1* | 3/2008 | Boussoukaia | H04W 8/245 |
| | | | | 455/558 |
| 2010/0322425 | A1* | 12/2010 | Park | H04L 63/0428 |
| | | | | 380/270 |
| 2011/0078245 | A1* | 3/2011 | Kiffer | G06Q 20/3278 |
| | | | | 709/204 |
| 2011/0126002 | A1* | 5/2011 | Fu | H04L 63/0823 |
| | | | | 713/156 |
| 2011/0252240 | A1 | 10/2011 | Freedman et al. | |
| 2011/0320401 | A1* | 12/2011 | Mahajan | A63F 13/00 |
| | | | | 707/614 |
| 2012/0106533 | A1* | 5/2012 | Chen | H04W 4/001 |
| | | | | 370/342 |
| 2012/0108294 | A1* | 5/2012 | Kaul | G06K 7/0013 |
| | | | | 455/558 |
| 2013/0157700 | A1* | 6/2013 | Chen | H04W 4/12 |
| | | | | 455/466 |
| 2013/0252584 | A1* | 9/2013 | Cuadrat | H04L 67/125 |
| | | | | 455/411 |
| 2013/0305339 | A1* | 11/2013 | Amiel | G06F 21/77 |
| | | | | 726/9 |
| 2014/0109176 | A1 | 4/2014 | Barton et al. | |
| 2014/0310701 | A1* | 10/2014 | Chylinski | G06F 8/65 |
| | | | | 717/173 |
| 2016/0295544 | A1* | 10/2016 | Jiang | H04L 5/0053 |

OTHER PUBLICATIONS

Joos Cadonau ED et al., "Chapter 11: OTA and Secure SIM Lifecycle Management", Jan. 1, 2008, Smart Cards, Tokens, Security and Applications, Springer, US, pp. 257-275.

* cited by examiner

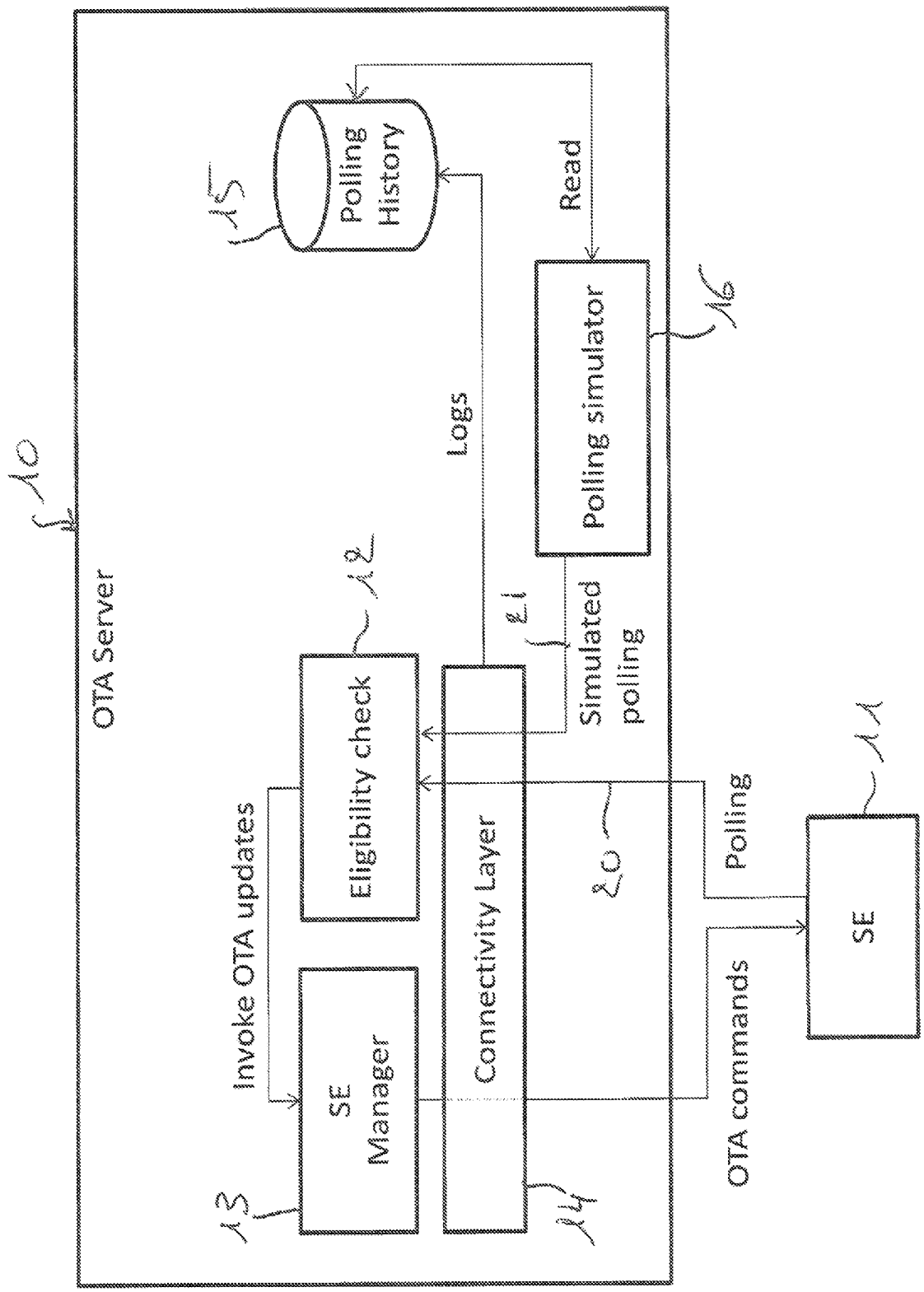

METHOD FOR DETECTING DYNAMICALLY THAT SECURE ELEMENTS ARE ELIGIBLE TO AN OTA CAMPAIGN AND CORRESPONDING OTA SERVER

The present invention relates to the field of telecommunications and more specifically to the remote administration of secure elements, such as UICCs (Universal Integrated Circuit Cards), eSE (embedded Secure Elements), memory cards, micro-SD cards or eUICCs (embedded UICCs) interacting with devices, for example portable devices such as telephones, smartphones, PDAs or computers. Secure elements can also be in the form of circuits installed in machines, such as circuits in the area of M2M (Machine to Machine). They may not be physically connected to the terminals, but can communicate with them by a short-distance connection where a secure elemnt is remotely located and communicates through a short distance channel with the terminal (Bluetooth or Wi-Fi for example).

Such administration of secure elements is typically performed by OTA (Over The Air) to update or install programs or data in secure elements. Administration of this type uses the HTTP (HyperText Transfer Protocol) protocol and is also called 'RFM' (Remote File Management) or 'RAM' (Remote Administration Management) by HTTP.

There are two ways to administrate secure elements:

A first way is to address the secure elements in a push mode for example using static secure elements lists. A list of secure elements is built using selection criteria before the execution of the campaign and these secure elements are addressed during the campaign. However, the targeted list of secure elements to be updated via an OTA campaign is evolving permanently during the execution of a campaign (new subscriptions can be activated, cards or secure elements can be switched from one device to another, cards can be replaced, . . . ). This limitation becomes critical when the number of secure elements is large (can be several millions) and when the campaign lasts over a long period (several weeks or even months) to reach all the secure elements in the field. For instance, if a MNO (Mobile Network Operator) is provisioning new subscriptions in the OTA platform while a campaign is running for which the newly provisioned elements could be eligible for a campaign, the MNO will need to run a second campaign to update the newly provisioned subscriptions.

A second way is to realize campaign management over HTTP in pull mode with dynamic eligibility mechanism: In this solution, no target list is built but secure elements are defined through an eligibility criterion. Secure elements are polling regularly to contact the OTA platform and to check if there is a pending update for them. The eligibility criterion is evaluated when the secure element is polling, providing the benefit to allow reaching elements that were deployed after the beginning of the campaign. However, this solution has a big limitation: it is supported only by secure elements supporting HTTP bearer. Moreover, it has an important drawback when no or few secure elements have to be updated (an important network traffic is created to support the periodic HTTP polling sessions between million of secure elements and the OTA platform).

The problem is to find a way to manage OTA campaigns with dynamic target lists whatever the bearer (SMS, CAT-TP, HTTP, . . . ) to be used to perform the remote operations. CAT-TP stands for Card Application Toolkit Transport Protocol.

This objective is reached thanks to a method for detecting dynamically that secure elements are eligible to at least one OTA campaign for updating the secure elements, each secure element cooperating with a telecommunication terminal in a telecommunication network, this updating being realized by an OTA server, the method consisting in:

Detecting which secure elements have not polled the OTA server for a given time frame;

Checking eligibility for these secure elements;

Updating the secure elements that did not poll the OTA server for this given time frame and that are eligible to the OTA campaign by pushing messages to these secure elements.

The invention therefore proposes to apply the push mode described previously to secure elements that did not poll the OTA server since a given date and that are eligible to an update.

Advantageously, the messages that are pushed to the secure elements are SMS messages, independently of the bearers that are supported by the secure elements.

The invention also concerns an OTA server for updating secure elements cooperating with telecommunication terminals in a telecommunication network, this OTA server comprising:

Means for detecting which secure elements have not polled the OTA server for a given time frame;

Means for checking eligibility for these secure elements;

Means for updating these secure elements that have not polled the OTA server for this given time frame and that are eligible to the OTA campaign by pushing messages to these secure elements.

Other features and advantages will appear in the description below of a preferred implementation of the invention, given in reference to FIG. 1.

FIG. 1 represents a system implementing the present invention.

In this FIGURE, an OTA server 10 is provided for updating secure elements 11, only one secure element 11 being represented. The updating of the secure elements 11 is classically done during OTA campaigns. Each secure element 11 cooperates with a telecommunication terminal (not represented) in a telecommunication network. A secure element is for example a UICC, a SIM card or an embedded secure element (eSE).

According to the second way to administrate secure elements 11 described previously, each secure element regularly polls (during a step 20) over HTTP the OTA server 10 in order to check if this OTA server 10 has to update the secure element 11. The server 10 has means 12 for checking the eligibility of the secure element 11 for an update. This eligibility consists in checking if there are data or programs that have to be downloaded in the secure element 11. If the SE is eligible for an update, a SE manager 13 sends OTA commands to the SE 11 through a connectivity layer 14, also used during the polling step 20. After having sent the commands to the SE 11 (and after a check that the update was successfully done), the connectivity layer 14 sends a log to a database 15 in order to register which commands have been sent to the SE 11 (which programs have been downloaded or updated) and the date of the update of this SE 11. This date is hereafter called Last_Polling_Date and corresponds to the last time the SE 11 has polled the OTA server 10 querying for potential updates to be sent over-the-air. The OTA server 10 can communicate with secure elements 11 using SMS, CAT-TP and HTTP bearers. Polling mechanism from secure elements to the platform is using HTTP bearer only (data channel).

This way corresponds to the classical (known) way to administrate secure elements 11 (pull mode).

According to the invention, the OTA server comprises a polling simulator 16 that is parsing periodically the full database 15 of secure elements 11 and simulates a polling (step 21) for each SE 11 that is not naturally polling the OTA server 10. These secure elements 11 that are not polling are those that are using only SMS bearer (2G or 3G subscriptions in general), those that do not support the HTTP protocol, those that cooperate with telecommunication terminals that are not BIP (Bearer Independent Protocol) compliant but also secure elements that are supposed to poll but are not polling due to their geographical position (data coverage issues, roaming situations, . . . ). The polling simulator 16 will be using the Last_Polling_Date criteria for simulating a polling (step 21) of these secure elements 11, as if they would have really polled. The simulated pollings are addressed to the means 12 for checking the eligibility for updating these secure elements 11. After an eligibility check of these secure elements that didn't poll for a given time frame, those for which an update is necessary or available are indicated to the SE manager 13 that sends OTA commands to these secure elements 11. These secure elements are then updated even if they didn't poll the OTA server. The eligibility check is the same than previously used in campaign management over HTTP in pull mode.

Thus, the polling simulator 16 emulates polling of secure elements that didn't poll the OTA server 10 for a given time frame (since a given time). These secure elements are considered by the OTA server (at the level of the eligibility check means 12) as having really polled.

The invention thus proposes to enter in a push mode for secure elements that didn't contact the OTA server 10 since a given time (for example no polling since two weeks ago).

The OTA server 10 uses a bearer adapted to each SE to be updated: Secure elements supporting only SMS will be updated over SMS (push SMS), those supporting HTTP will be updated over HTTP (push HTTP). The volume of the data or commands to be sent to the secure elements can also be considered: If these data or commands can enter in a SMS (size lower than approximately 1 Kb), a push SMS can be preferred to the establishment of a HTTP session for example.

Another solution is to address the secure elements independently from the bearer they support. This means that all the secure elements will be addressed via SMS only. This ensures for example that secure elements that are not under data coverage (no HTTP possible) but are under network coverage (they can receive SMS messages) will be updated. This allows also the update of secure elements comprised in terminals which users have switched off the reception of data, for example while being abroad for avoiding billing of data traffic.

The invention allows deploying HTTP secure elements without periodic polling activated, the polling being simulated and in case of eligibility the secure elements can be updated in push mode. The benefit is to optimize network resources.

Moreover, in case of secure elements deployed with periodic polling activated, cards that will be inserted in non BIP capable terminals will never be able to poll the OTA server. The invention, thanks to the polling emulator, allows performing remote OTA operations on them using an alternate bearer (SMS).

The invention claimed is:

1. Method for remote administration of secure elements, each secure element cooperating with a telecommunication terminal in a telecommunication network, said remote administration being realized by an OTA server, said method comprising:
   Detecting which secure elements have not polled said OTA server for a given time frame;
   Checking eligibility for said secure elements; and
   Updating said secure elements that did not poll said OTA server for said given time frame and that are eligible to said remote administration by pushing messages to said secure elements.

2. Method according to claim 1, wherein said messages pushed to said secure elements are SMS messages, independently of bearers that are supported by said secure elements.

3. An OTA server for updating secure elements cooperating with telecommunication terminals in a telecommunication network, said OTA server comprising:
   Means for detecting which secure elements have not polled said OTA server for a given time frame;
   Means for checking eligibility for said secure elements; and
   Means for updating said secure elements that have not polled said OTA server for said given time frame and that are eligible for remote administration by pushing messages to said secure elements.

4. The OTA server according to claim 3, wherein said means for detecting which secure elements have not polled said OTA server for a given time frame are constituted by a polling simulator.

5. The OTA server according to claim 3, wherein said messages pushed to said secure elements are SMS messages, independently of bearers that are supported by said secure elements.

* * * * *